United States Patent
Pawar et al.

(10) Patent No.: US 10,341,858 B1
(45) Date of Patent: Jul. 2, 2019

(54) SYSTEMS AND METHODS FOR OBSCURING USER LOCATION

(71) Applicant: Symantec Corporation, Mountain View, CA (US)

(72) Inventors: Shrikant Pawar, Mumbai (IN); Sharad Mhaske, Ahmednagar (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 16/007,308

(22) Filed: Jun. 13, 2018

(51) Int. Cl.
*H04M 1/66* (2006.01)
*H04W 12/02* (2009.01)
*H04W 4/02* (2018.01)

(52) U.S. Cl.
CPC ........... *H04W 12/02* (2013.01); *H04W 4/027* (2013.01)

(58) Field of Classification Search
CPC . H04W 12/08; H04W 72/0406; H04W 12/12; H04W 24/02; H04W 48/16; H04W 8/08; H04W 12/02; H04W 36/0038
See application file for complete search history.

(56) References Cited

U.S. PATENT DOCUMENTS

| | | | | |
|---|---|---|---|---|
| 2011/0061106 | A1* | 3/2011 | Kovacs | G06F 21/6245 726/26 |
| 2015/0079932 | A1* | 3/2015 | Zelinka | H04W 4/029 455/411 |

* cited by examiner

*Primary Examiner* — Khalid W Shaheed
(74) *Attorney, Agent, or Firm* — FisherBroyles, LLP (57) ABSTRACT

The disclosed computer-implemented method for obscuring user location may include (i) detecting a motion of a user mobile device through a motion sensor of the user mobile device, (ii) checking whether the motion of the user mobile device satisfies a specified threshold that defines a threshold level of motion, (iii) determining that the motion of the user mobile device satisfies the specified threshold that defines the threshold level of motion, and (iv) protecting a user of the user mobile device by obscuring, in response to determining that the motion of the user mobile device satisfies the specified threshold, an actual location of the user mobile device by outputting information indicating a decoy location of the user mobile device that deviates from the actual location of the user mobile device. Various other methods, systems, and computer-readable media are also disclosed.

20 Claims, 8 Drawing Sheets

SYSTEMS AND METHODS FOR OBSCURING USER LOCATION

BACKGROUND

With the widespread use of smartphones which sense, collect, and process valuable information about the user and the user's whereabouts, ensuring location privacy has become one of the most important concerns for cybersecurity vendors. Moreover, with the rise of employees using their own personal vehicles to commute to work, attackers can learn a great deal about a particular user by tracking the location of the user's mobile device. For example, in some cases attackers may be able to ascertain information about a particular user's office location, employee details, home address, regular halting spots (e.g., a coffee shop), etc., by tracking the location of the user's mobile device.

Additionally, when mobile devices disclose the locations of their users, the mobile devices may thereby expose the users to location-based risks. These location-based risks may include spam threats, scam threats, and/or unsolicited advertising. In some cases, the location-based risks may include potential victimization in terms of blackmail and/or violence. In view of the above, the instant disclosure identifies and addresses a need for improved systems and methods for obscuring user location.

SUMMARY

As will be described in greater detail below, the instant disclosure describes various systems and methods for obscuring user location. In one example, a computer-implemented method for obscuring user location may include (i) detecting a motion of a user mobile device through a motion sensor of the user mobile device, (ii) checking whether the motion of the user mobile device satisfies a specified threshold that defines a threshold level of motion, (iii) determining that the motion of the user mobile device satisfies the specified threshold that defines the threshold level of motion, and (iv) protecting a user of the user mobile device by obscuring, in response to determining that the motion of the user mobile device satisfies the specified threshold, an actual location of the user mobile device by outputting information indicating a decoy location of the user mobile device that deviates from the actual location of the user mobile device.

In some examples, protecting the user of the user mobile device is performed in response to the user authorizing the user mobile device to output the information indicating the decoy location. In one embodiment, the user authorizes the user mobile device to output the information indicating the decoy location in response to the user mobile device requesting for authorization to output the information indicating the decoy location.

In one embodiment, the user mobile device requests for authorization to output the information indicating the decoy location prior to determining that the motion of the user mobile device satisfies the specified threshold that defines the threshold level of motion. In one embodiment, the user mobile device requests for authorization to output the information indicating the decoy location in response to determining that the motion of the user mobile device satisfies the specified threshold that defines the threshold level of motion.

In some examples, outputting information indicating the decoy location of the user mobile device that deviates from the actual location of the user mobile device may include: accessing a detected location of the user mobile device that was detected by a location sensor of the user mobile device and altering the detected location of the user mobile device such that an accuracy of the detected location of the user mobile device is reduced. In some examples, outputting information indicating the decoy location of the user mobile device that deviates from the actual location of the user mobile device may include substituting the decoy location of the user mobile device for a detected location of the user mobile device that was detected by a location sensor of the user mobile device.

In one embodiment, the computer-implemented method may further include detecting that the user mobile device has returned to the actual location of the user mobile device when the user mobile device first moved according to the motion of the user mobile device that satisfies the specified threshold and stopping the outputting of the decoy location in response to determining that the user mobile device has returned to the actual location. In one embodiment, the motion of the user mobile device corresponds to a user of the user mobile device commuting, and outputting the information indicating the decoy location of the user mobile device prevents an attacker from obtaining an item of information about the user commuting. In one embodiment, outputting the information indicating the decoy location of the user mobile device that deviates from the actual location of the user mobile device includes providing the decoy location to a mobile application that tracks movement by the user.

In one embodiment, a system for implementing the above-described method may include (i) a detection module, stored in memory, that detects a motion of a user mobile device through a motion sensor of the user mobile device, (ii) a checking module, stored in memory, that checks whether the motion of the user mobile device satisfies a specified threshold that defines a threshold level of motion, (iii) a determination module, stored in memory, that determines that the motion of the user mobile device satisfies the specified threshold that defines the threshold level of motion, (iv) a protection module, stored in memory, that protects a user of the user mobile device by obscuring, in response to determining that the motion of the user mobile device satisfies the specified threshold, an actual location of the user mobile device by outputting information indicating a decoy location of the user mobile device that deviates from the actual location of the user mobile device, and (v) at least one physical processor configured to execute the detection module, the checking module, the determination module, and the protection module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect a motion of a user mobile device through a motion sensor of the user mobile device, (ii) check whether the motion of the user mobile device satisfies a specified threshold that defines a threshold level of motion, (iii) determine that the motion of the user mobile device satisfies the specified threshold that defines the threshold level of motion, and (iv) protect a user of the user mobile device by obscuring, in response to determining that the motion of the user mobile device satisfies the specified threshold, an actual location of the user mobile device by outputting information indicating a decoy location of the user mobile device that deviates from the actual location of the user mobile device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for obscuring user location. The disclosed subject matter may improve upon related systems by dynamically modifying, distorting, and/or obfuscating a location of the user mobile device in response to detecting that the user mobile device has moved in accordance with a threshold level of movement. The disclosed subject matter may thereby improve upon systems that only obscure the location of the user mobile device in a static, binary, or unintelligent manner. Furthermore, the disclosed subject matter may also enable the user to intelligently select one or more decoy routes as substitutes for the actual group that the user travels when commuting, as discussed further below.

Figure 1:
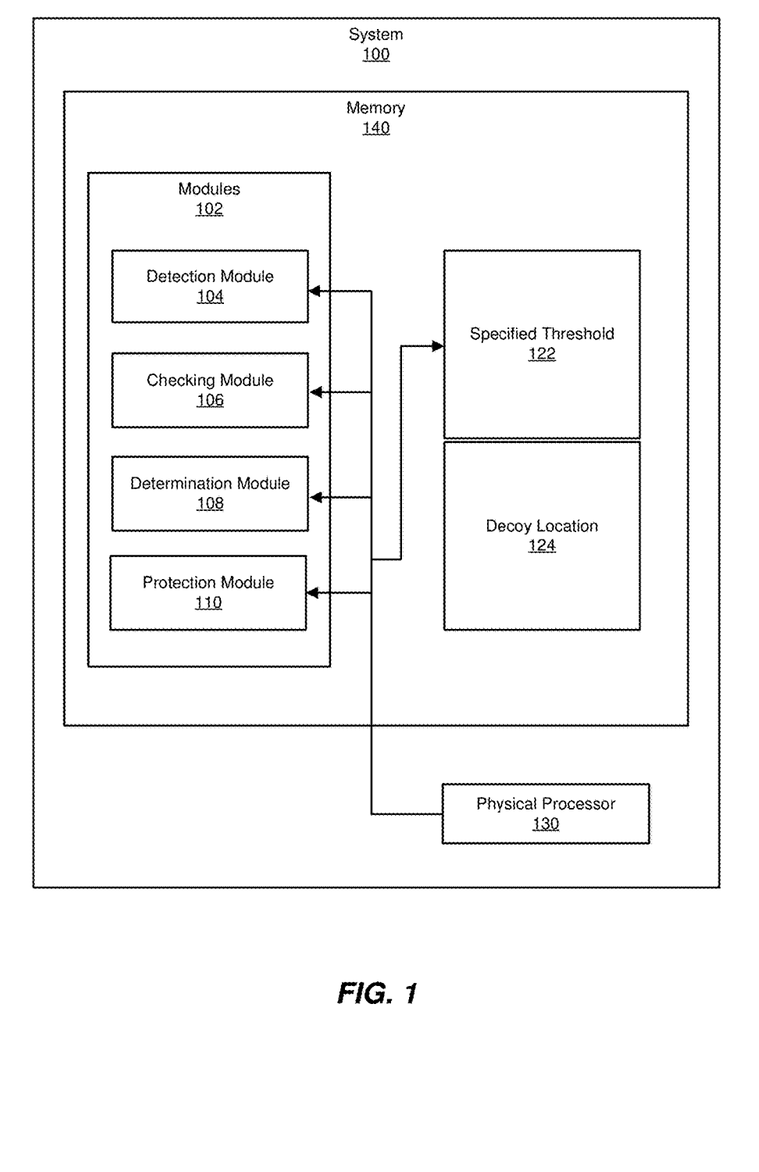
FIG. 1 is a block diagram of an example system for obscuring user location.
Figure 2:
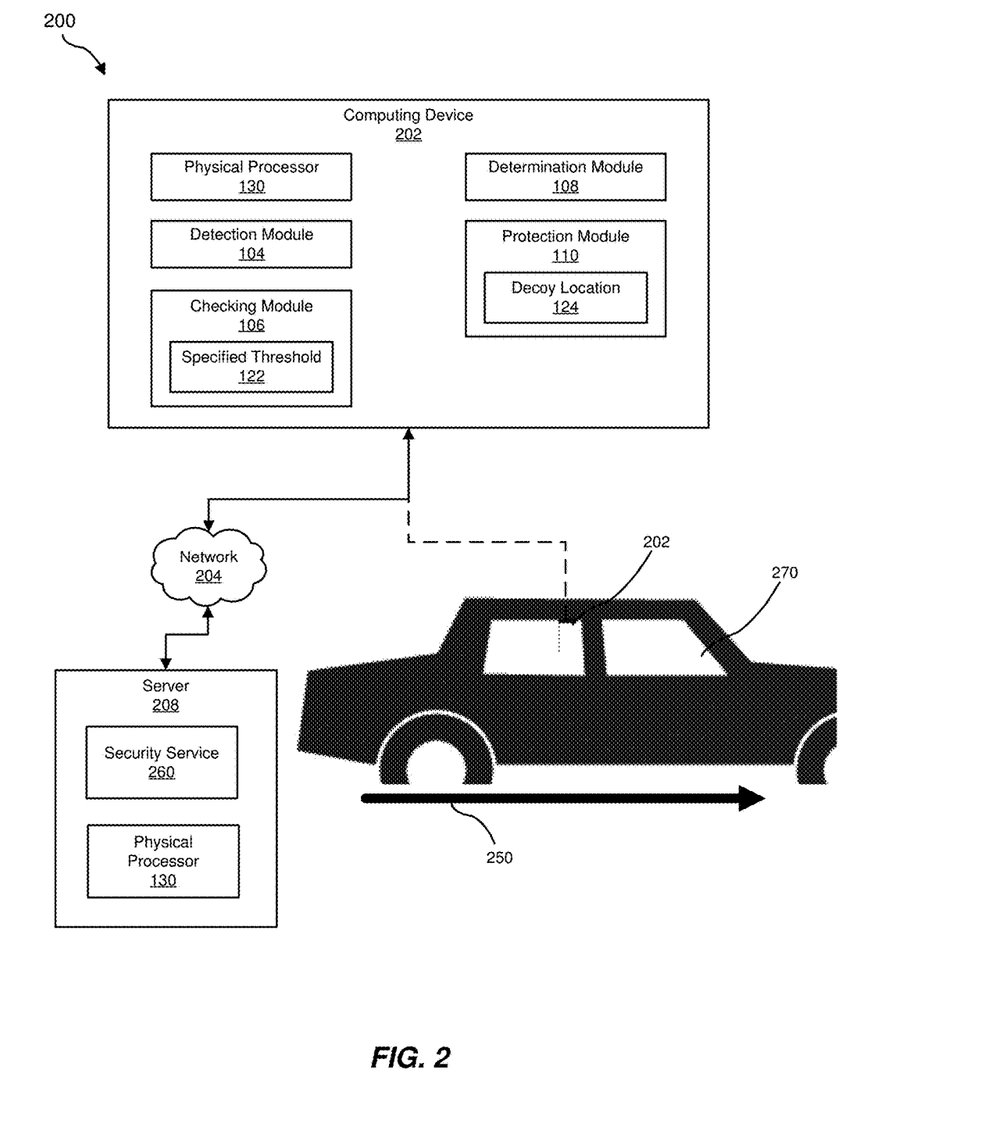
FIG. 2 is a block diagram of an additional example system for obscuring user location.

The following will provide, with reference to FIGS. 1-2, detailed descriptions of example systems for obscuring user location. Detailed descriptions of corresponding computer-implemented methods will also be provided in connection with FIGS. 3-6. In addition, detailed descriptions of an example computing system and network architecture capable of implementing one or more of the embodiments described herein will be provided in connection with FIGS. 7 and 8, respectively.

FIG. 1 is a block diagram of example system 100 for obscuring user location. As illustrated in this figure, example system 100 may include one or more modules 102 for performing one or more tasks. For example, and as will be explained in greater detail below, example system 100 may include a detection module 104 that detects a motion of a user mobile device through a motion sensor of the user mobile device. Example system 100 may additionally include a checking module 106 that checks whether the motion of the user mobile device satisfies a specified threshold, such as a specified threshold 122, that defines a threshold level of motion. Example system 100 may also include a determination module 108 that determines that the motion of the user mobile device satisfies the specified threshold that defines the threshold level of motion. Example system 100 may additionally include a protection module 110 that protects a user of the user mobile device by obscuring, in response to determining that the motion of the user mobile device satisfies the specified threshold, an actual location of the user mobile device by outputting information indicating a decoy location, such as a decoy location 124, of the user mobile device that deviates from the actual location of the user mobile device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 208). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate obscuring user location. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 208 via a network 204. In one example, all or a portion of the functionality of modules 102 may be performed by computing device 202, server 208, and/or any other suitable computing system. As will be described in greater detail below, one or more of modules 102 from FIG. 1 may, when executed by at least one processor of computing device 202 and/or server 208, enable computing device 202 and/or server 208 to obscure a user's location.

For example, and as will be described in greater detail below, detection module 104 may detect a motion, such as a motion 250, of a user mobile device, such as computing device 202, through a motion sensor of the user mobile device. In the example of FIG. 2, computing device 202 may correspond to a smartphone that a user is carrying with himself or herself while traveling inside of a car 270. Accordingly, computing device 202 may include the motion sensor that detects motion 250. In response, checking module 106 may check whether motion 250 of computing device 202 satisfies a specified threshold 122. Specified threshold 122 may define a threshold level of motion, as further described below. Subsequently, determination module 108 may determine that motion 250 of computing device 202 satisfies specified threshold 122 that defines the threshold level of motion. Protection module 110 may protect a user of computing device 202 by obscuring, in response to determining that the motion of computing device 202 satisfies the specified threshold, an actual location of the computing device 202 by outputting information indicating decoy location 124 of computing device 202 that deviates from the actual location of computing device 202.

Computing device 202 generally represents any type or form of computing device capable of reading computer-executable instructions. In some illustrative examples, computing device 202 may correspond to a smart phone or other mobile device, as further described above. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

FIG. 2 further illustrates how computing device 202 may optionally be connected to a server 208. In some examples, server 208 may correspond to a backend security server of a cybersecurity vendor such as SYMANTEC. Server 208 may optionally include a security service 260, as further illustrated in FIG. 2. Security service 260 may collect telemetry data from one or more of modules 102 and/or interface with modules 102 to facilitate the performance of method 300, as discussed further below. Additional examples of server 208 include, without limitation, security servers, application servers, web servers, storage servers, and/or database servers configured to run certain software applications and/or provide various security, web, storage, and/or database services. Although illustrated as a single entity in FIG. 2, server 208 may include and/or represent a plurality of servers that work and/or operate in conjunction with one another.

Network 204 generally represents any medium or architecture capable of facilitating communication or data transfer. In one example, network 204 may facilitate communication between computing device 202 and server 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
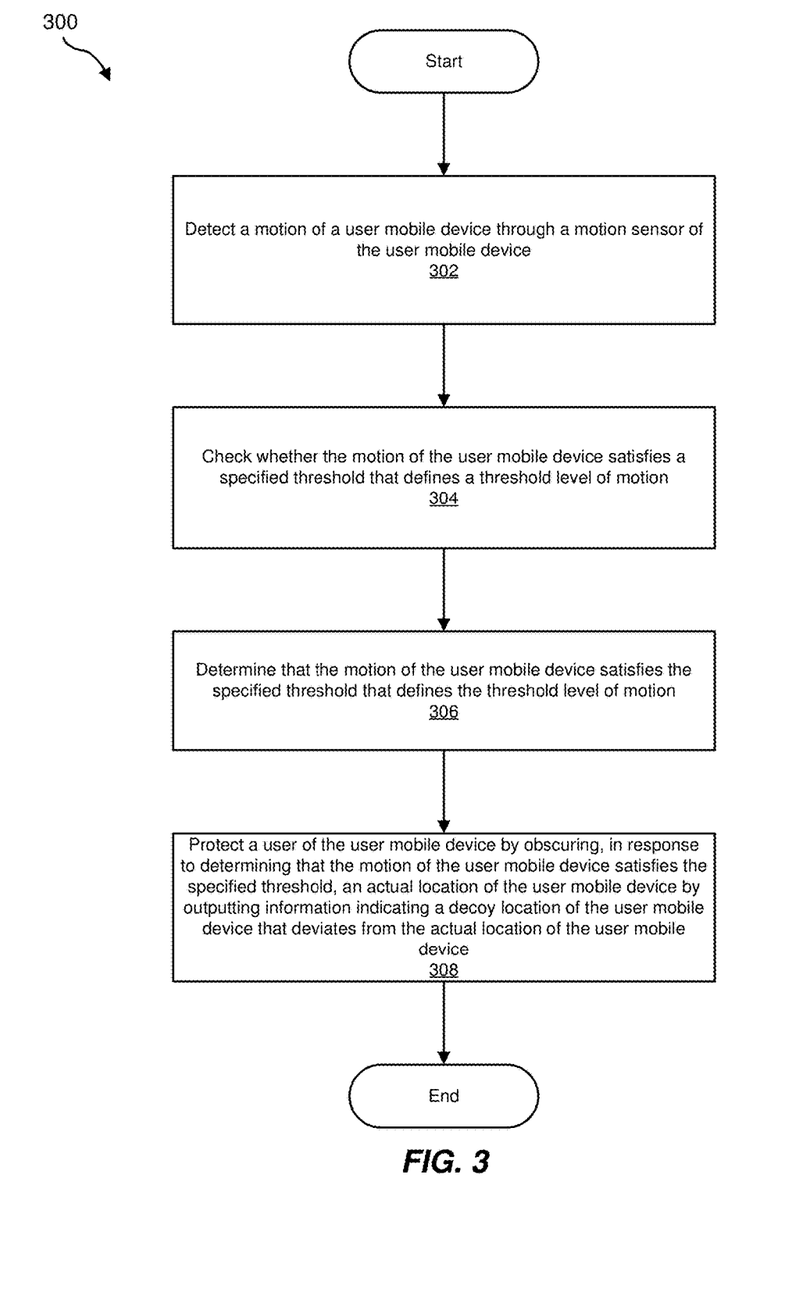
FIG. 3 is a flow diagram of an example method for obscuring user location.

FIG. 3 is a flow diagram of an example computer-implemented method 300 for obscuring user location. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect a motion of a user mobile device through a motion sensor of the user mobile device. For example, detection module 104 may, as part of computing device 202 in FIG. 2, detect motion 250 of computing device 202 through a motion sensor of computing device 202. As used herein, the term "user mobile device" generally refers to any mobile computing device operated or owned by a user. Moreover, the illustrative examples of the motion sensor of the user mobile device may include accelerometers, gyroscopes, global positioning systems sensors, geolocation sensors, proximity sensors, motion detectors, and/or networking components (e.g., Wi-Fi, Internet, cellular) when those networking components are used to detect motion, such as detecting motion through triangulation or other network-based location detection techniques.

Detection module 104 may detect the motion of the user mobile device in a variety of ways. In general, detection module 104 may detect the motion of the user mobile device automatically in response to the user mobile device moving according to the motion. In some examples, detection module 104 may rely upon a motion sensor that must have previously been enabled, or toggled on, in order to detect the motion of the user mobile device. For example, the user may previously have toggled the motion sensor within a settings menu of the user mobile device to enable the motion sensor to detect the motion of the user mobile device. In general, detection module 104 may, as part of a motion sensor of the user mobile device, monitor for movement by the user mobile device. In some examples, detection module 104 may monitor for movement of the user mobile device in a continuous manner. In other examples, detection module 104 may monitor for movement of the user mobile device in a serial or discontinuous manner, such as by sampling over discrete periods of time. Detection module 104 may rely upon any one or more of the illustrative examples of motion sensors further described above, including accelerometers, gyroscopes, global positioning systems sensors, geolocation sensors, proximity sensors, motion detectors, and/or networking components (e.g., Wi-Fi, Internet, cellular) when those networking components are used to detect motion, such as detecting motion through triangulation or other network-based location detection techniques.

At step 304, one or more of the systems described herein may check whether the motion of the user mobile device satisfies a specified threshold that defines a threshold level of motion. For example, checking module 106 may, as part of computing device 202 in FIG. 2, check whether the motion of computing device 202 satisfies specified threshold 122 that defines a threshold level of motion.

As used herein, the terms "specified threshold" and "threshold level of motion" generally refer to an arbitrary level of motion predefined, or otherwise specified, as distinguishing between motion significant enough to trigger the performance of method 300, on the one hand, and motions that are not significant enough to trigger the performance of method 300, because the motions are too small, trivial, or insignificant (e.g., these motions indicate a trivial amount of movement by the user mobile device shaking in the user's pocket, or as the user walks from one side of a room to another side of the room, without indicating a larger or more significant movement corresponding to the user changing addresses or otherwise commuting). In some examples, the specified threshold defines the threshold level of motion in terms of at least one of speed and distance. For example, the specified threshold may define a threshold level of speed beyond which movement of the user mobile device at that speed triggers the performance of the remainder of method 300. Similarly, the specified threshold may define the threshold level of distance beyond which movement of the user mobile device triggers the performance of the remainder of method 300. In some examples, the specified threshold may be defined in terms of a more complicated heuristic or algorithm that uses both speed and/or distance as factors of the heuristic or algorithm.

At step 306, one or more of the systems described herein may determine that the motion of the user mobile device satisfies the specified threshold that defines the threshold level of motion. For example, determination module 108 may, as part of computing device 202 in FIG. 2, determine that motion 250 of computing device 202 satisfies specified threshold 122 that defines the threshold level of motion.

Determination module 108 may determine that the motion of the user mobile device satisfies the specified threshold that defines the threshold level of motion in a variety of ways. In some examples, determination module 108 may apply a "greater than or equal to" operation to determine whether the motion of the user mobile device indicates a numerical measurement that is greater than, or equal to, the specified threshold. In other examples, determination module 108 may apply a "greater than" operation to determine whether the motion of the user mobile device indicates a numerical measurement that is simply greater than the specified threshold. Moreover, in one or more of these examples the specified threshold may be defined in terms of a threshold speed and/or a threshold distance, as further outlined above.

At step 308, one or more of the systems described herein may protect a user of the user mobile device by obscuring, in response to determining that the motion of the user mobile device satisfies the specified threshold, an actual location of the user mobile device by outputting information indicating a decoy location of the user mobile device that deviates from the actual location of the user mobile device. For example, protection module 110 may, as part of computing device 202 in FIG. 2, protect a user of computing device 202 by obscuring, in response to determining that motion 250 of computing device 202 satisfies specified threshold 122, an actual location of computing device 202 by outputting information indicating decoy location 124 of computing device 202 that deviates from the actual location of computing device 202.

Figure 4:
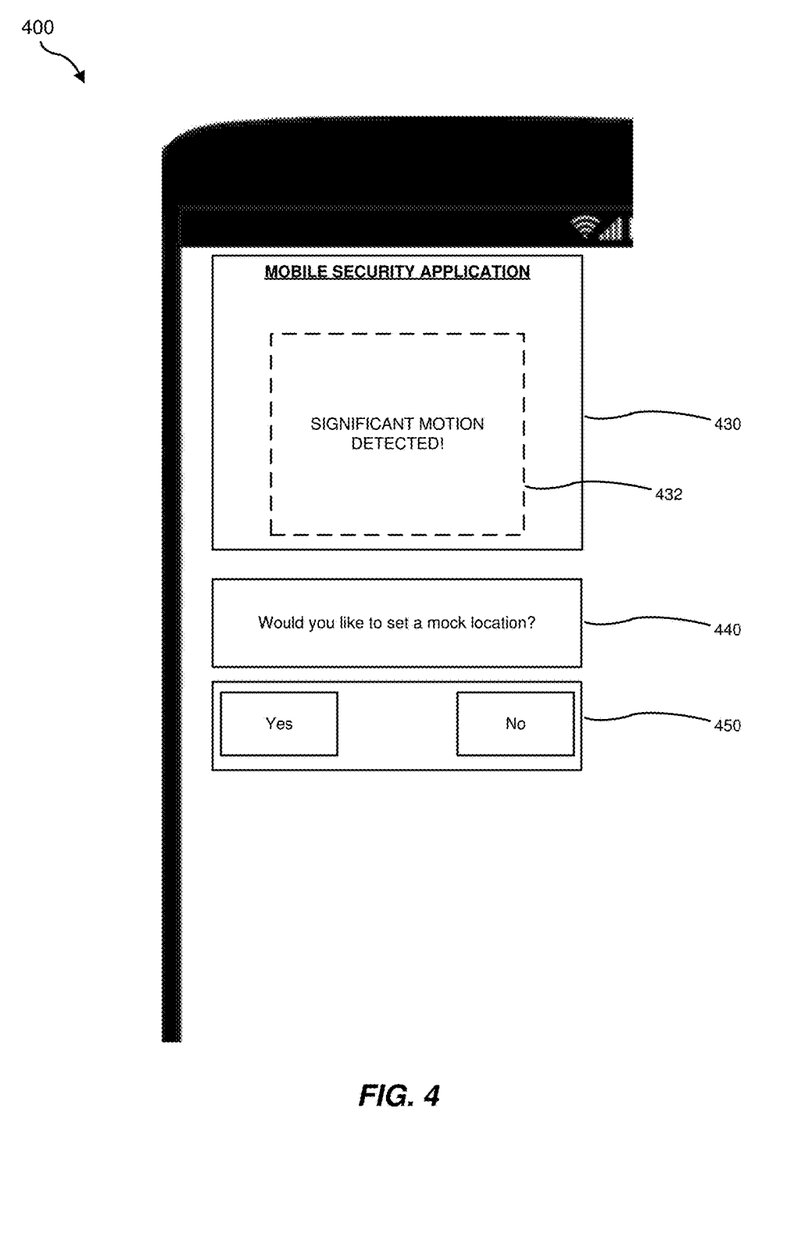
FIG. 4 is a block diagram of an example smartphone display corresponding to the method for obscuring user location.

Protection module 110 may protect the user of the user mobile device in a variety of ways. In some examples, protection module 110 may protect the user of the user mobile device in response to the user authorizing the user mobile device to output the information indicating the decoy location. FIG. 4 illustrates an example smartphone display 400 that provides a graphical user interface with which the user may authorize the user mobile device to output the information indicating the decoy location. As further shown in this figure, smartphone display 400 may include a graphical window 430 corresponding to a mobile security application. Moreover, within graphical window 430 the corresponding mobile security application may display an alert 432 specifying "SIGNIFICANT MOTION DETECTED!" This example text, which is merely illustrative, highlights one embodiment of the message for indicating to the user that the user mobile device is detected the motion satisfying the threshold level of motion in accordance with steps 304 and 306 of method 300.

Furthermore, in some examples, the user authorizes the user mobile device to output the information indicating the decoy location in response to the user mobile device requesting for authorization to output the information indicating the decoy location. Returning to the example of FIG. 4, graphical window 430 of the mobile security application may further issue a prompt 440 that inquires of the user "Would you like to set a mock location?" Additionally, graphical window 430 of the mobile security application may optionally further display a prompt 450, which includes two separate buttons corresponding to "yes" and "no," respectively, as further shown in FIG. 4. In view of the above, the user may optionally select either the button corresponding to "yes" or the button corresponding to "no" within the prompt 450, thereby indicating whether the user wishes to set the mock location or decoy location in accordance with step 308 of method 300, as described in more detail below.

In the example of FIG. 4, the user grants authorization to set the decoy location in response to the detection of the significant motion, but in other examples the order of these two steps may be reversed. For example, the user may optionally configure the user mobile device to automatically set the decoy location in response to the detection of the significant motion. Accordingly, after the user has first granted this authorization, then the user mobile device may automatically begin outputting the decoy location in response to detecting the significant motion, without requesting further authorization from the user, such as by displaying the alert 432 and/or the prompt 440 that are shown in FIG. 4. In general, in some examples the user mobile device may request for authorization to output the information indicating the decoy location prior to determining that the motion of the user mobile device satisfies the specified threshold that defines the threshold level of motion.

In some examples, protection module 110 may protect the user by outputting the information indicating the decoy location of the user mobile device that deviates from the actual location of the user mobile device by performing two optional steps. First, protection module 110 may access a detected location of the user mobile device that was detected by a location sensor of the user mobile device. For example, protection module 110 may access a detected geolocation of the user mobile device that was detected by a geolocation sensor or global positioning system sensor of the user mobile device. Second, protection module 110 may subsequently alter the detected location of the user mobile device such that an accuracy of the detected location of the user mobile device is reduced. In these examples, protection module 110 may optionally "fuzz" the detected location of the user mobile device in a manner that renders the detected location of the user mobile device less accurate and/or less precise, thereby helping to obscure or obfuscate the actual location of the user mobile device and protect the user's privacy accordingly. Similarly, in related examples, protection module 110 may output the information indicating the decoy location of the user mobile device that deviates from the actual location of the user mobile device by substituting the decoy location of the user mobile device for a detected location of the user mobile device that was detected by a location sensor of the user mobile device.

Figure 5:
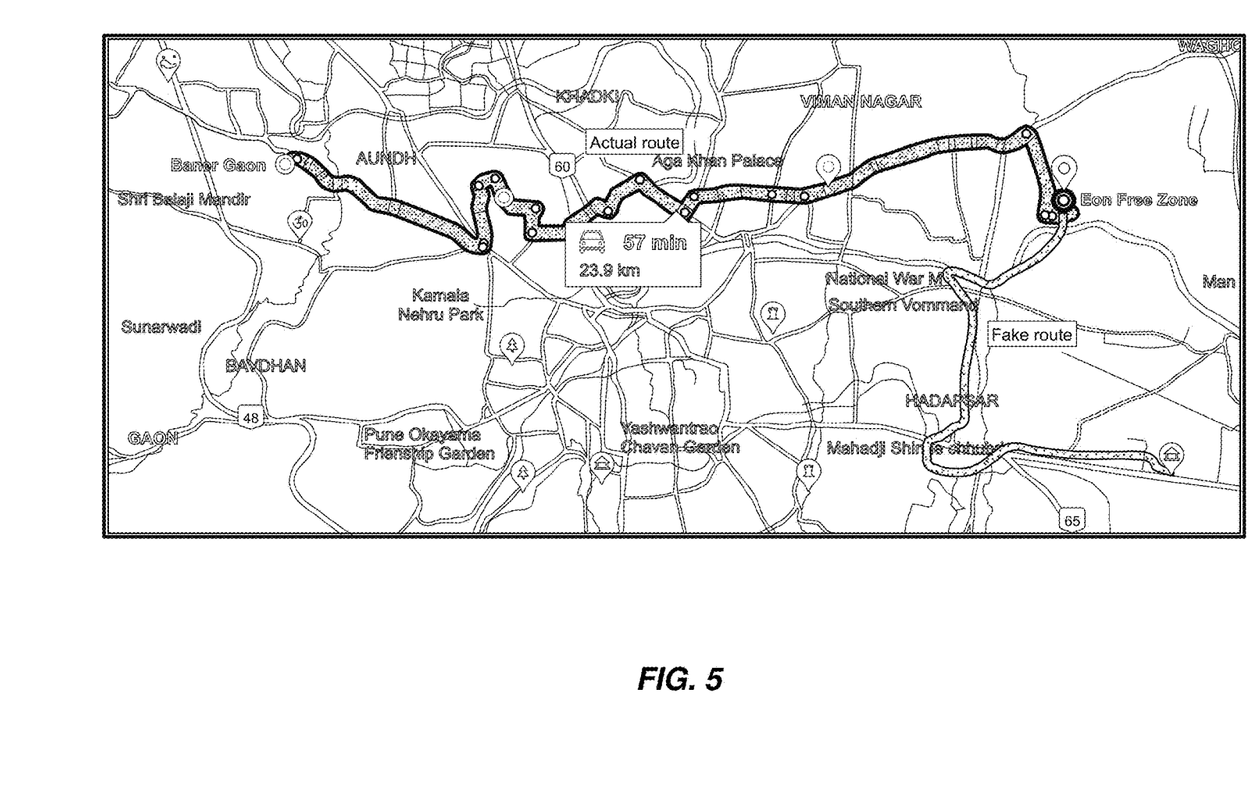
FIG. 5 is a block diagram of an example geolocation display corresponding to the method for obscuring user location.

FIG. 5 illustrates an example of a geolocation display that corresponds to an embodiment of method 300. As further shown in this figure, a user may travel an "actual route" from the origination location of the "Eon Free Zone" to the destination location of the "Baner Gaon." As the user begins to travel along this route, which may correspond to the user's commute, the movement may trigger a "significant motion" that is detected in accordance with steps 302, 304, and 306 of method 300, as further outlined above. Accordingly, in these examples protection module 110 may (e.g., either before the significant motion is detected or in response to detection of the significant motion) grant the user the option to obfuscate the location of the user by substituting the "actual route" with the "fake route" that is further shown in FIG. 5. FIG. 5 illustrates how the "fake route" has essentially no overlap with the "actual route" and, instead, progresses to the south and to the east away from the "Eon Free Zone." In this example, both the "actual route" and the "fake route" begin at essentially the same location, which is the "Eon Free Zone." In other examples, however, the "actual route" and the "fake route" may optionally begin at essentially or substantially different locations.

In some examples, protection module 110 may have a level of intelligence or sophistication that enables protection module 110 to pace the decoy movement of the user mobile device along the "fake route" in a manner that is proportional to the actual movement of the user mobile device along the "actual route" such that the decoy movement of the user mobile device along the "fake route" begins and ends at essentially, or substantially, the same times corresponding to the actual movement of the user mobile device along the "actual route." Protection module 110 may perform this pacing function even if the distance of the "actual route" and the distance of the "fake route" are different. For example, protection module 110 may adjust the speed of the user mobile device along the "fake route" to ensure that the decoy movement of the user mobile device along the "fake route" ends at essentially the same time as the user mobile device actually arrives at the end of the "actual route."

Moreover, in some examples, protection module 110 may additionally detect that the user mobile device has returned to the actual location of the user mobile device when the user mobile device first moved according to the motion of the user mobile device that satisfies the specified threshold. Returning to the example of FIG. 5, protection module 110 may detect that the user mobile device has successfully traveled both (i) from the original location of the "Eon Free Zone" to the destination of "Baner Gaon" and also (ii) from the destination location of "Baner Gaon" back to the original location of the "Eon Free Zone." In other words, this "actual route" may correspond to a commute that the user makes, such as a commute that the user makes on a daily basis. The commute may correspond to a commute that the user makes to travel from the user's home residence to an office location, and back, on a daily basis. In such examples, protection module 110 may detect that the user mobile device has successfully completed the entirety of the commute, including both the traveling to the destination location and traveling back to the original location. In response, protection module 110 may optionally stop the outputting of the decoy location. In other words, protection module 110 may optionally stop the outputting of the decoy location in response to determining that the user has completed the commute and, therefore, there is no need to further disguise or obfuscate information about the commute. In these examples, outputting the information indicating the decoy location of the user mobile device may prevent an attacker from obtaining an item of information about the user commuting.

Figure 6:
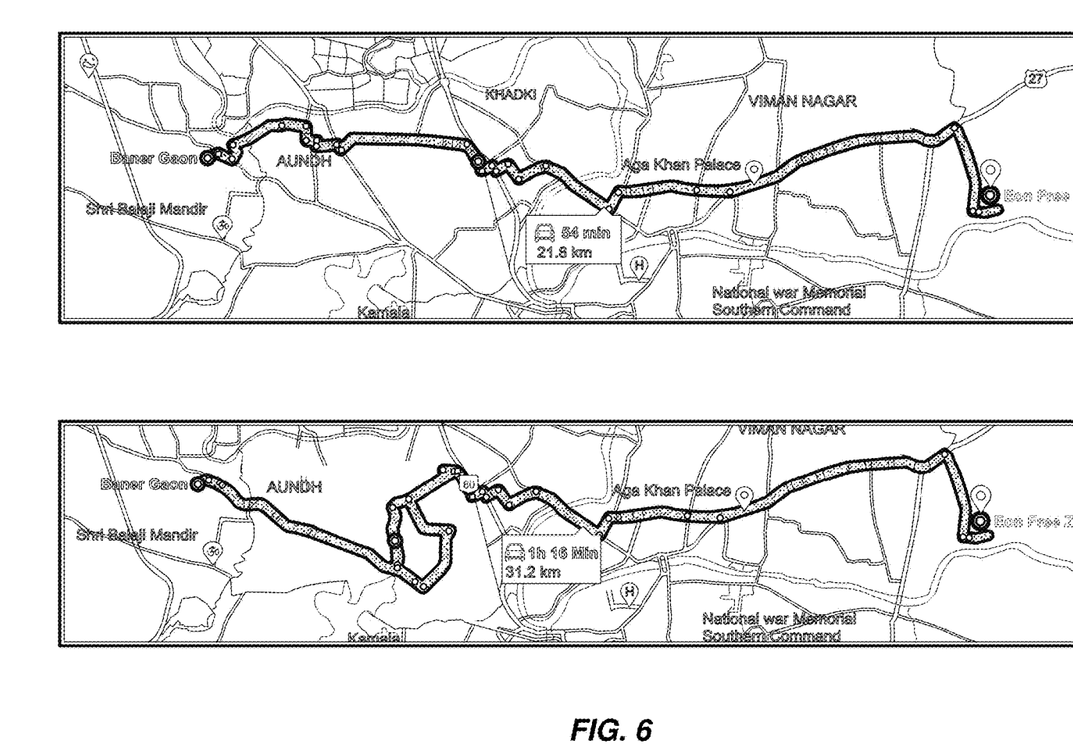
FIG. 6 is a block diagram of another example geolocation display corresponding to the method for obscuring user location.

FIG. 6 shows another example of an illustrative geolocation display corresponding to method 300. As further shown in this figure, protection module 110 may have previously reported two separate routes in which the user travels from "Baner Gaon" to the "Eon Free Zone." In this example, both of these reported routes may be "fake" routes that are reported using decoy locations in accordance with method 300. Protection module 110 may optionally provide the user with ability to select one or more of a multitude of displays of reported routes, such as the reported route shown in FIG. 6, thereby enabling the user to select which "fake route" will be used in a particular instance of performing method 300.

Protection module 110 may record these "fake" routes and store them to enable the user to reuse them during later performances of method 300 (e.g., in response to the detection of different instances of the user making the commute and/or in response to the detection of different instances of a significant motion). FIG. 6 also illustrates how "reported route 1" and "reported route 2" are slightly different, even though they indicate routes from the same original location to the same destination location. In other words, protection module 110 may alter details, paths, routes, and/or internal commuting decisions when reusing a previously reported "fake route." Accordingly, protection module 110 may thereby help to increase the seeming authenticity of the instances of the "fake route" and thereby improve the ability to deceive attackers who are seeking to ascertain one or more items of information about the user's actual location and/or the user's actual commute. Because the different instances of the "fake route" will have slight variations different between them, they will thereby have an increasing appearance of authenticity corresponding to actual instances of the user traveling that route, where the user will typically not travel the route in exactly the same way each time.

In additional or alternative examples, outputting the information indicating the decoy location of the user mobile device that deviates from the actual location of the user mobile device includes providing the decoy location to a mobile application that tracks movement by the user. For example, the mobile application that tracks the movement by the user may include a mobile gaming application, such as POKEMON GO. In these examples, providing the decoy location to the mobile application that tracks movement by the user may enable the user to provide a decoy, or simulated, movement to the mobile application that deviates from the actual movement by the user. For example, a user sitting at home, or walking within the user's living room, may provide input to the mobile application that simulates that the user is walking outside of the user's home and walking to a local park. In further examples, protection module 110 may protect against "cheating" within the mobile application by limiting the simulated movement of the user. For example, protection module 110 may limit the user to simulated walking or bicycling, which may prevent a type of cheating (e.g., prevent faster simulated movement) within a mobile gaming application such as POKEMON GO while also protecting the privacy of the user's actual location.

As further explained above, the disclosed subject matter may improve upon related systems by dynamically modifying, distorting, and/or obfuscating a location of the user mobile device in response to detecting that the user mobile device has moved in accordance with a threshold level of movement. The disclosed subject matter may thereby improve upon systems that only obscure the location of the user mobile device in a static, binary, or unintelligent manner. Furthermore, the disclosed subject matter may also enable the user to intelligently select one or more decoy routes as substitutes for the actual route that the user travels when commuting.

Figure 7:
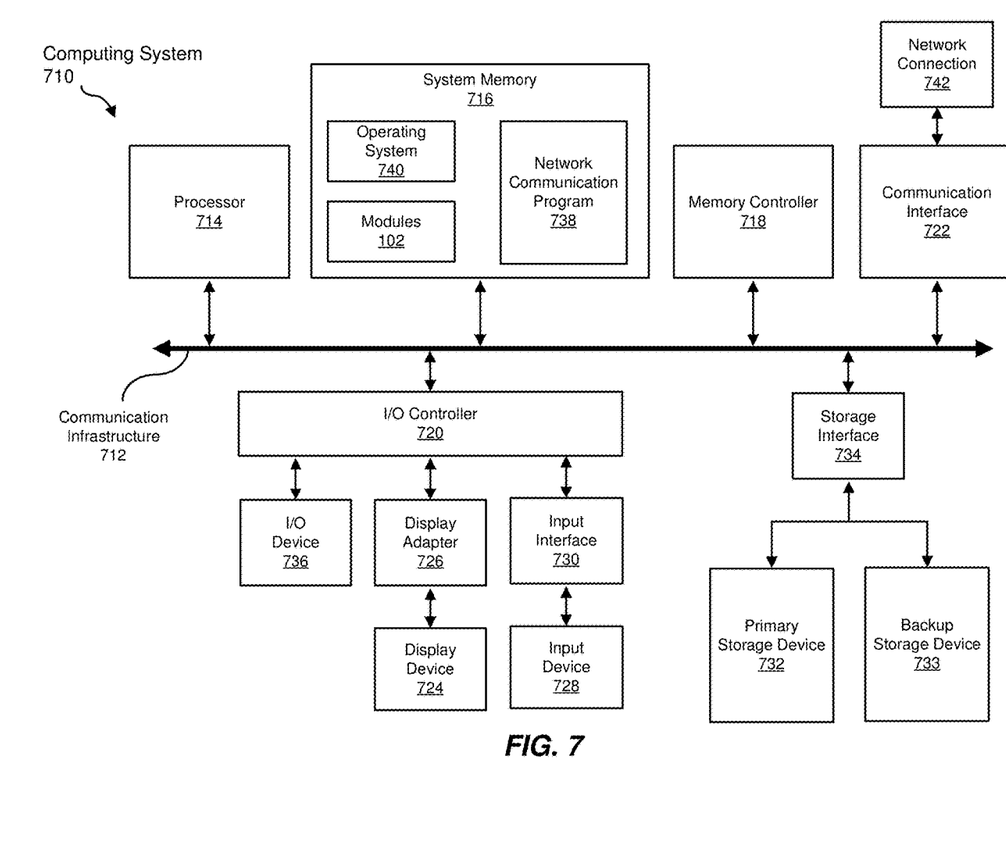
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
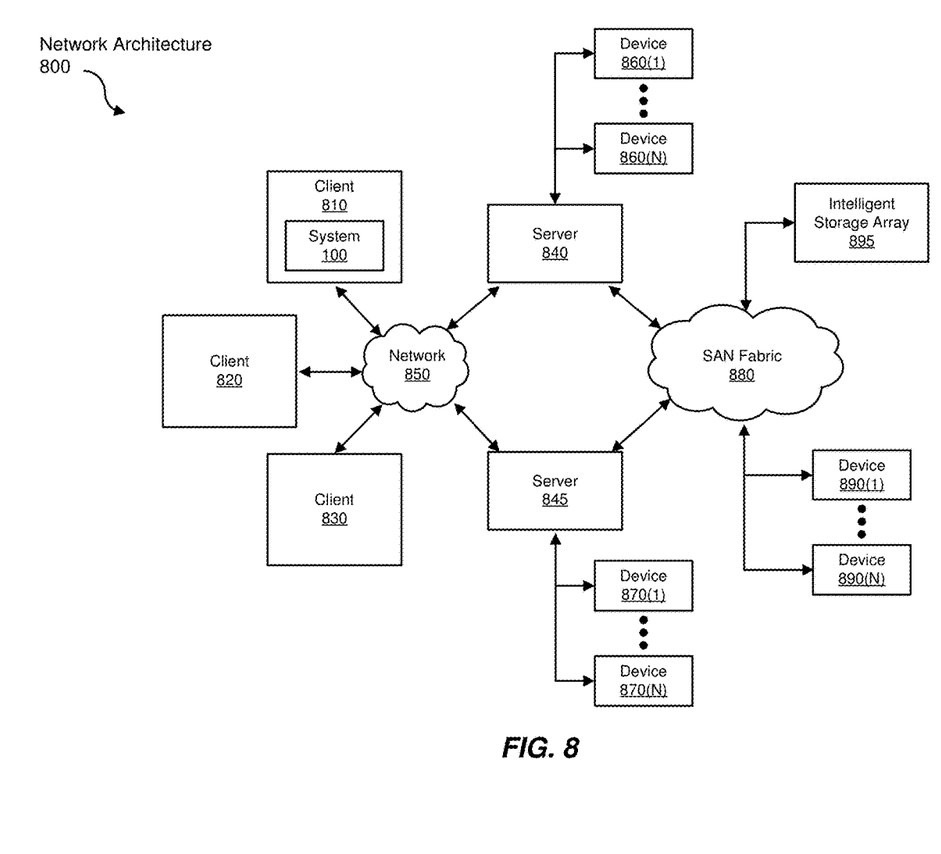
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for obscuring user location.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for obscuring user location, at least a portion of the method being performed by a computing device comprising at least one processor, the method comprising:

detecting a motion of a user mobile device through a motion sensor of the user mobile device;

checking whether the motion of the user mobile device satisfies a specified threshold that defines a threshold level of motion;

determining that the motion of the user mobile device satisfies the specified threshold that defines the threshold level of motion; and protecting a user of the user mobile device by obscuring, in response to determining that the motion of the user mobile device satisfies the specified threshold, an actual location of the user mobile device by outputting information indicating a decoy location of the user mobile device that deviates from the actual location of the user mobile device at least in part by:

accessing a detected location of the user mobile device that was detected by a location sensor of the user mobile device; and altering the detected location of the user mobile device such that an accuracy of the detected location of the user mobile device is reduced; wherein:

the user mobile device requests for authorization to output the information indicating the decoy location prior to determining that the motion of the user mobile device satisfies the specified threshold that defines the threshold level of motion.

2. The computer-implemented method of claim 1, wherein protecting the user of the user mobile device is performed in response to the user authorizing the user mobile device to output the information indicating the decoy location.

3. The computer-implemented method of claim 2, wherein the user authorizes the user mobile device to output the information indicating the decoy location in response to the user mobile device requesting for authorization to output the information indicating the decoy location.

4. The computer-implemented method of claim 1, wherein detecting the motion of the user mobile device through the motion sensor of the user mobile device is performed after the user previously toggled the motion sensor within a settings menu of the user mobile device to enable the motion sensor to detect the motion of the user mobile device.

5. The computer-implemented method of claim 1, wherein the motion sensor comprises at least one of:
 an accelerometer;
 a gyroscope;
 a global positioning systems sensor;
 a geolocation sensor;
 a proximity sensor; or
 a network triangulation component.

6. The computer-implemented method of claim 1, wherein the specified threshold is defined in terms of at least one of speed or distance.

7. The computer-implemented method of claim 1, wherein outputting the information indicating the decoy location of the user mobile device that deviates from the actual location of the user mobile device comprises substituting the decoy location of the user mobile device for the detected location of the user mobile device that was detected by the location sensor of the user mobile device.

8. The computer-implemented method of claim 1, further comprising:
 detecting that the user mobile device has returned to the actual location of the user mobile device when the user mobile device first moved according to the motion of the user mobile device that satisfies the specified threshold; and
 stopping the outputting of the decoy location in response to determining that the user mobile device has returned to the actual location.

9. The computer-implemented method of claim 1, wherein:
 the motion of the user mobile device corresponds to the user of the user mobile device commuting; and
 outputting the information indicating the decoy location of the user mobile device prevents an attacker from obtaining an item of information about the user commuting.

10. The computer-implemented method of claim 1, wherein outputting the information indicating the decoy location of the user mobile device that deviates from the actual location of the user mobile device comprises providing the decoy location to a mobile application that tracks movement by the user.

11. A system for obscuring user location, the system comprising:
 a detection module, stored in memory, that detects a motion of a user mobile device through a motion sensor of the user mobile device;
 a checking module, stored in memory, that checks whether the motion of the user mobile device satisfies a specified threshold that defines a threshold level of motion;
 a determination module, stored in memory, that determines that the motion of the user mobile device satisfies the specified threshold that defines the threshold level of motion;
 a protection module, stored in memory, that protects a user of the user mobile device by obscuring, in response to determining that the motion of the user mobile device satisfies the specified threshold, an actual location of the user mobile device by outputting information indicating a decoy location of the user mobile device that deviates from the actual location of the user mobile device at least in part by:
  accessing a detected location of the user mobile device that was detected by a location sensor of the user mobile device; and
  altering the detected location of the user mobile device such that an accuracy of the detected location of the user mobile device is reduced; and
 at least one physical processor configured to execute the detection module, the checking module, the determination module, and the protection module; wherein:
 the user mobile device requests for authorization to output the information indicating the decoy location prior to determining that the motion of the user mobile device satisfies the specified threshold that defines the threshold level of motion.

12. The system of claim 11, wherein the protection module protects the user of the user mobile device in response to the user authorizing the user mobile device to output the information indicating the decoy location.

13. The system of claim 12, wherein the user authorizes the user mobile device to output the information indicating the decoy location in response to the user mobile device requesting for authorization to output the information indicating the decoy location.

14. The system of claim 11, wherein the detection module is configured to detect the motion of the user mobile device through the motion sensor of the user mobile device after the user previously toggled the motion sensor within a settings menu of the user mobile device to enable the motion sensor to detect the motion of the user mobile device.

15. The system of claim 11, wherein the motion sensor comprises at least one of:
 an accelerometer;
 a gyroscope;
 a global positioning systems sensor;
 a geolocation sensor;
 a proximity sensor; or
 a network triangulation component.

16. The system of claim 11, wherein the specified threshold is defined in terms of at least one of speed or distance.

17. The system of claim 11, wherein the protection module outputs the information indicating the decoy location of the user mobile device that deviates from the actual location of the user mobile device by substituting the decoy location of the user mobile device for the detected location of the user mobile device that was detected by the location sensor of the user mobile device.

18. The system of claim 11, wherein the protection module further:
   detects that the user mobile device has returned to the actual location of the user mobile device when the user mobile device first moved according to the motion of the user mobile device that satisfies the specified threshold; and
   stops the outputting of the decoy location in response to determining that the user mobile device has returned to the actual location.

19. The system of claim 11, wherein:
   the motion of the user mobile device corresponds to the user of the user mobile device commuting; and
   the protection module outputting the information indicating the decoy location of the user mobile device prevents an attacker from obtaining an item of information about the user commuting.

20. A non-transitory computer-readable medium comprising one or more computer-readable instructions that, when executed by at least one processor of a computing device, cause the computing device to:
   detect a motion of a user mobile device through a motion sensor of the user mobile device;
   check whether the motion of the user mobile device satisfies a specified threshold that defines a threshold level of motion;
   determine that the motion of the user mobile device satisfies the specified threshold that defines the threshold level of motion; and
   protect a user of the user mobile device by obscuring, in response to determining that the motion of the user mobile device satisfies the specified threshold, an actual location of the user mobile device by outputting information indicating a decoy location of the user mobile device that deviates from the actual location of the user mobile device at least in part by:
      accessing a detected location of the user mobile device that was detected by a location sensor of the user mobile device; and
      altering the detected location of the user mobile device such that an accuracy of the detected location of the user mobile device is reduced; wherein:
   the user mobile device requests for authorization to output the information indicating the decoy location prior to determining that the motion of the user mobile device satisfies the specified threshold that defines the threshold level of motion.

* * * * *